March 10, 1936. A. C. GRONBECK 2,033,138
APPARATUS FOR LOW TEMPERATURE DISTILLATION
Original Filed May 23, 1929 4 Sheets-Sheet 1

INVENTOR
Axel C. Gronbeck
BY
ATTORNEYS

March 10, 1936.  A. C. GRONBECK  2,033,138
APPARATUS FOR LOW TEMPERATURE DISTILLATION
Original Filed May 23, 1929   4 Sheets-Sheet 3

Fig. 4.

INVENTOR
Axel C. Gronbeck
BY
his ATTORNEYS

Patented Mar. 10, 1936

2,033,138

UNITED STATES PATENT OFFICE 2,033,138

APPARATUS FOR LOW TEMPERATURE DISTILLATION

Axel C. Gronbeck, New York, N. Y.

Application May 23, 1929, Serial No. 365,281
Renewed October 12, 1933

16 Claims. (Cl. 202—119)

This invention relates to low temperature distillation and more particularly to the provision of an improved apparatus for the low temperature destructive distillation of organic materials, such for example as garbage, and all kinds of city and industrial organic waste materials, and also such materials as coal, lignite, oil shale, wood, and the like.

When such organic materials are heated in a closed chamber, or a chamber from which air is excluded, first of all any moisture present is driven off. Then the constituents of the materials are decomposed and a complex series of reactions takes place forming a large number of substances. At the temperature and pressure under which the distillation is carried on, some of these substances exist as volatile products, that is, vapors or gases, while others are liquid and the residue is mainly carbon or charcoal. The crude products of the distilling process are hence vapors and gases, thin liquids, viscous liquids or tar, and carbon or charcoal.

Thus for example when wood, usually in the form of sawdust, is subjected to such a distilling process, moisture is driven off, the cellulose and ligneous matter decomposed, and the reactions which occur form numerous substances. Among the thin liquid products resulting from these reactions are methyl alcohol, acetic acid, acetone, methyl acetate, phenols and ketones. Among the viscous liquids are aromatic hydrocarbons and paraffines, including creosote oil and phenols of high molecular weight. The principal gases evolved are hydrogen, methane, ethane, ethylene, carbon monoxide and carbon dioxide.

When refuse such for example as garbage or sewage sludge is treated, a similar formation of liquid, gaseous and solid products takes place, the complexity of the reactions, and the number of final products formed depending upon the character of the refuse material.

The general object of the invention is to provide a distillation apparatus for such materials which is convenient to operate, effective in conserving heat and which can be constructed at moderate cost, or in other words, a distillation apparatus which is commercially attractive.

Another object of the invention is to provide a retort construction for such distillation apparatus that is particularly convenient to charge and discharge.

If the distillation process is carried on under appropriate conditions, it proceeds rapidly and with the production of a large proportion of fixed gas. These advantageous results I attribute to the occurrence of catalytic reactions between certain of the reactive constituents, catalytic agents in the form of carbon and inorganic materials being present in the material. Accordingly a further object of the invention is to provide a distillation apparatus that will produce rapid distillation of the material.

Another object of the invention is to provide a simple and effective means for continuously stirring and agitating the material undergoing distillation.

A further object of the invention is to provide a distillation apparatus that will produce a certain amount of "cracking" of some of the constituents, such for example as the breaking up of some of the complex hydrocarbons into lighter hydrocarbons.

In the accompanying drawings I have illustrated a low temperature distillation plant embodying the various features of my invention, and my invention will be described in connection with the plant illustrated in these drawings. This plant is intended primarily for the treatment of garbage and organic waste materials from municipalities but it can also be used for the treatment of industrial organic waste material as well as for the treatment of coal, lignite, oil shale, wood, and the like.

In these drawings.

Referring now to the accompanying drawings, the apparatus consists essentially of an elongated horizontal and preferably cylindrical retort 15, and an elongated and also preferably cylindrical preheater 16 extending upwardly from the retort, the whole being appropriately mounted in a setting 17 of fire brick or other suitable material. A two-unit apparatus has been illustrated, each unit consisting of a retort with its preheater, and preferably separate heating means.

The heating means comprise a series of burners 18 and 18a adapted to burn gas, oil, or other suitable fuel. This fuel is usually obtained from the operation of the distillation plant but can be supplied from outside sources if desired.

As the two distilling units are an exact duplicate of each other, the corresponding elements of the second unit have been designated by means of the subscript a.

The hot furnace gases directly heat the lower portions of the retorts, and are by means of baffles 19 and 19a compelled to pass upwardly around the sides of the retorts nearest the burners into the flues in which the preheaters 16 and 16a are mounted. The staggered baffles 20 and 20a cause the flue gases to circulate from side to side of the preheaters, and the gases are ultimately led from the tops of the preheaters through openings 21 and 21a into the breaching 22 which leads to the stack 23. A blower 24 is preferably provided for controlling the draft.

The control of the burners and of the operation of the principal mechanism of the distillation plant is carried out from the operating floor 25, while the garbage, refuse, coal or other material as previously mentioned, which it is desired to treat in the distillation plant is received on the charging floor 26. This material is charged through chutes 27 and 27a which extend above the charging floor and admit the material to the tops of the preheaters through charging valves 28 and 28a. The material is transferred by gravity from the preheaters 16 and 16a, by valves 29 and 29a. Valves 28 and 29 are preferably of the gate type and, because of their size they are preferably operated by means of electric motors 30 and 31.

The dimensions of the preheater and retort may vary widely, a practical size of preheater being about three feet in diameter and ten feet high, whereas the retort should be somewhat larger in diameter, for example, about four feet in diameter, six feet in length of furnace and overall length about twelve feet. Both the retort and the preheater are constructed of steel and are of a solid construction and firmly joined together so as to prevent the escape of gases therefrom.

Because of the relatively large size both of the retort and more particularly of the preheater, it is necessary to take special precautions to avoid undesirable stresses in the retort and preheater structures. The weight of a fresh charge in the preheater may be in the neighborhood of two tons and it is undesirable to have this additional weight borne entirely by the retort when the retort is heated to the operating temperature and hence may be somewhat weakened.

To overcome this difficulty the charging valves 28 and the upper end of the pre-heater are supported by means of a steel framework 32 which is carried by springs 33 resting upon the top of the setting 17. With the apparatus heated to operating temperature and with a fresh charge in the preheater, the downward pressure exerted by the preheater upon the retort will be approximately zero, the entire weight of the preheater and of the charge therein being carried upon springs 33. With this adjustment, when the apparatus is cold, the longitudinal contraction in the preheater will cause a compression of springs 33 and a corresponding upward tension in the walls of the preheater. A bending moment of some magnitude will thus exist in the retort when the apparatus is cold, but this will have no harmful effect either upon the retort, the preheater, or the setting.

Figure 4:
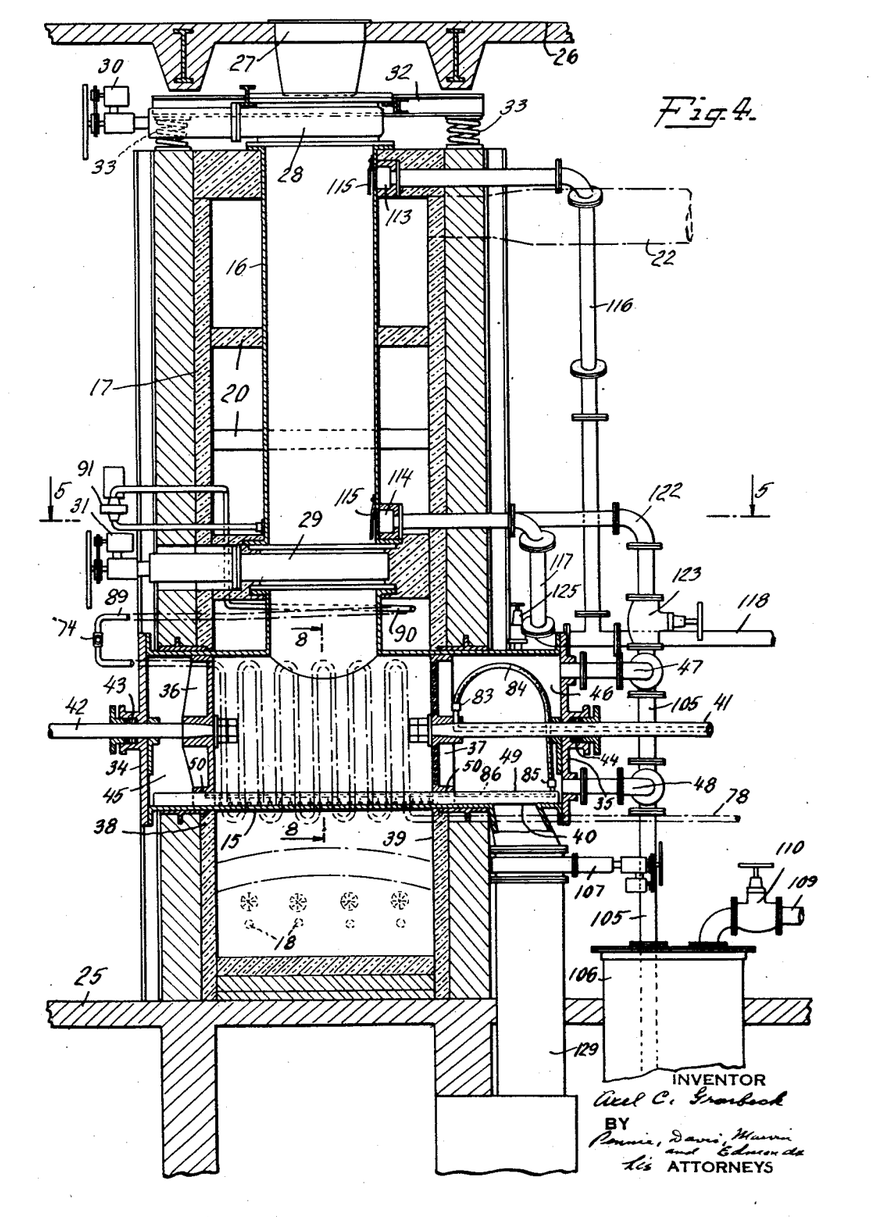
Fig. 4 is an enlarged section taken on line 4—4 of Fig. 2, or, in other words, a longitudinal vertical section taken centrally through the first or nearest unit shown in Fig. 1.

Referring now particularly to Fig. 4, the retort 15 is provided with heads 34 and 35 at its ends, and on the interior with pistons or rams 36, 37 which are normally positioned approximately in vertical alignment with the end walls 38 and 39 respectively of the furnace chamber and confine the charge between them so as to maintain it in the hottest part of the retort cylinder. The rear piston 37 is slidable from its normal position to a position adjacent the head 35 so as to uncover a discharge port 40 for the solid residue adjacent the rear end of the retort cylinder and preferably in the lower wall thereof. Rear piston 37 is mounted upon the inner end of a piston rod 41 by which the piston is actuated and for which purpose the rod extends through head 35 to an operating mechanism which will be presently described. The front or discharge piston 36 is similarly mounted upon the inner end of a piston rod 42.

After rear piston 37 has been moved to uncover the port 40, the discharge piston 36 is moved to the right in order to force the residue which has been left in the retort after a distilling operation toward the port 40 and cause its discharge from the retort. Piston rods 42 and 41, where they pass through the heads 34 and 35 respectively, are provided with packing glands 43 and 44 so as to prevent the escape of vapors or gases from the retort. It will be observed that when the pistons 36 and 37 are in normal position, chambers 45 and 46 are formed between the respective pistons and heads in which there is no material undergoing distillation, and these chambers therefore serve to retard the passage of heat through the end walls of the retort and thus reduce the operating temperature of the packing glands 43 and 44.

The vapors and gases which are evolved in the retort during distillation pass out through outlet connection 47 and any material which may remain liquid at the distillation temperature is drained through an outlet connection 48, both of these connections being made through rear head 35. It is not necessary that the pistons make an extremely tight fit with the walls of the retort, and rear piston 37 particularly is made to fit loosely so as to permit the evolved gases to pass to the outlet 47, and in addition piston 37 is perforated as shown in Figs. 4 and 8 so as to permit free passage of the vapors and liquids to the outlets.

An agitator bar 49 is arranged within the retort and carried by the pistons 36 and 37, recesses 50 being provided in the peripheries of the pistons for this purpose. The cross-section of the agitator bar may be seen in Fig. 7 from which it will be understood that it is of general trapezoidal shape with its wider face 51 adjacent the wall of the retort. The corners 52 are thus sharpened and directly engage the interior surface of the retort wall so as to effectively scrape off from the wall any of the material being treated which may tend to adhere thereto and form a cake.

Figures 8, 9, 10, 11:
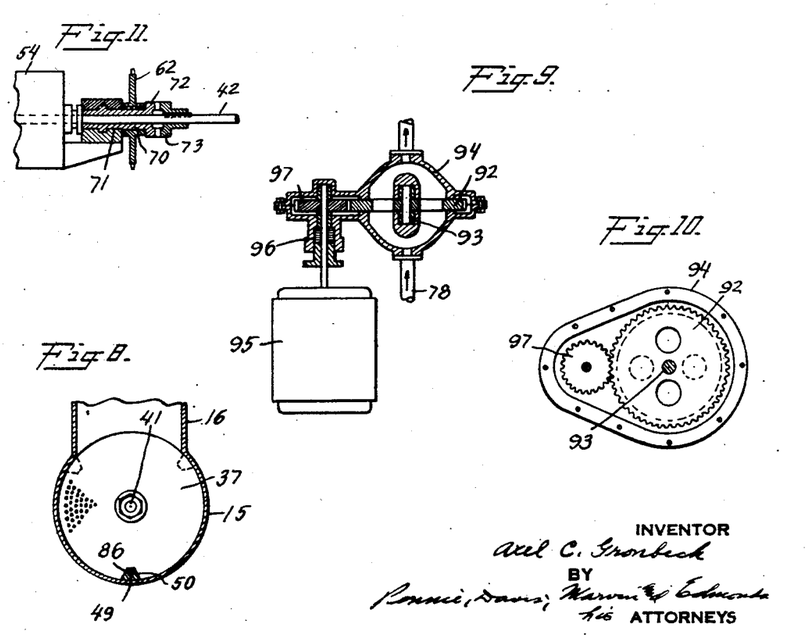
Fig. 8 is a transverse section on line 8—8 of Fig. 4 showing the travel of the agitator bar.
Figs. 9 and 10 illustrate a form of pulsation valve, Fig. 10 being an elevation of the valve shown in Fig. 9 with the lower half removed.
Fig. 11 is an enlarged view of a detail.

The recesses 50 in the two pistons are maintained approximately in alignment with one another so as to hold the agitator bar 49 approximately parallel with the axis of the retort, and the mechanism for actuating the pistons 41 and 42 is constructed so as to cause a partial rotation or oscillation of the pistons in the retort thus sweeping the agitator bar over about three-quarters of the inner periphery of the retort walls between the dotted positions shown in Fig. 8. The pistons preferably do not make a complete revolution because this would carry the agitator bar across the entrance to the retort from the preheater. The agitator bar thus serves not only to scrape off material which may tend to cake on to the interior walls of the retort, but to thoroughly stir the entire mass of material in the retort and keep it in a continuous state of agitation.

Figure 1:
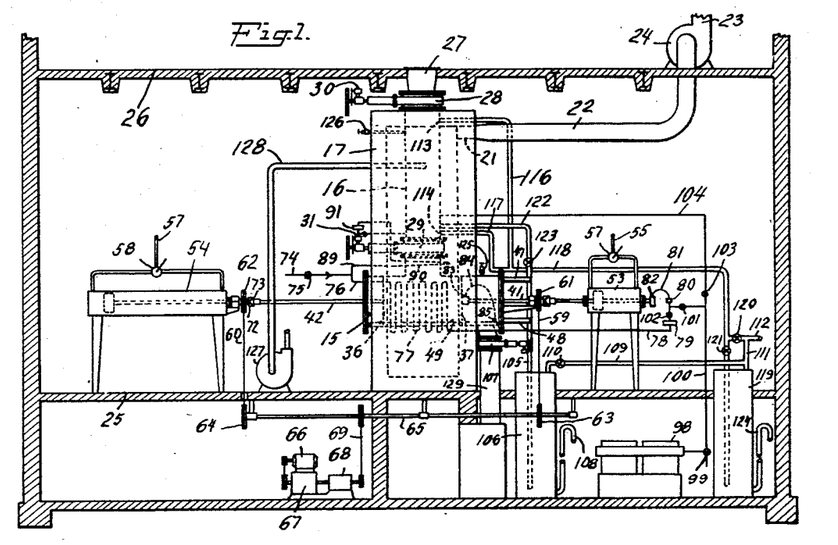
Fig. 1 is a diagrammatic or schematic elevation of the distillation plant, the front of the distillation apparatus being at the left, and the several floors of the building in which the plant is installed being shown in section.
Figure 2:
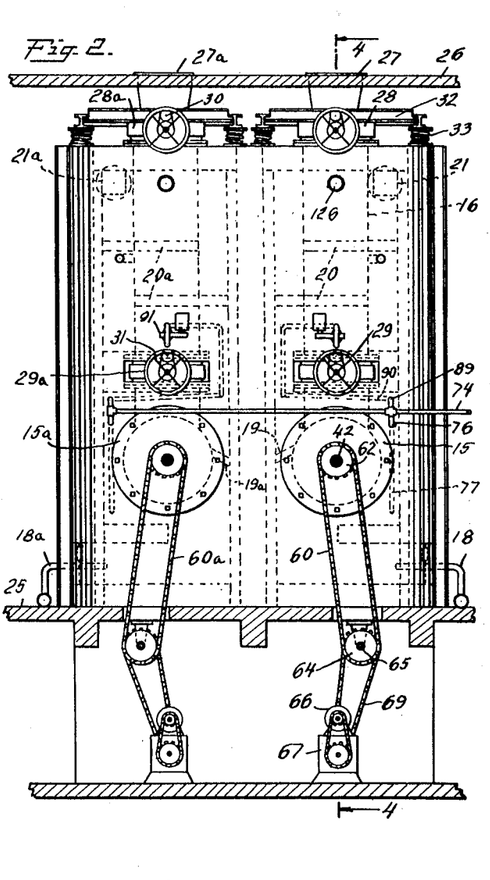
Fig. 2 is a front elevation of a part of the distillation apparatus shown in Fig. 1 on a somewhat enlarged scale.
Figure 3:
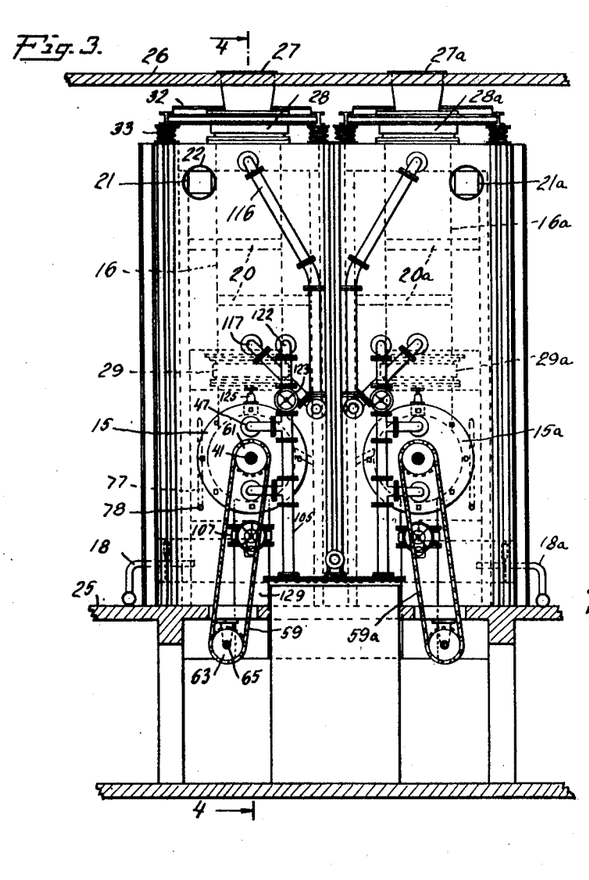
Fig. 3 is a rear elevation of the same part of the distillation apparatus.

The mechanism actuating the pistons and agitator bar is illustrated in Figs. 1, 2 and 3. The longitudinal movement of the pistons is accomplished by means of fluid operated cylinders 53 and 54. The operating piston within cylinder 53 is mounted upon the outer portion of piston rod 41 for the rear retort piston 37, and the movement of retort piston 37 is accomplished by the admission of fluid under pressure from a supply pipe 55 under the control of a four-way valve 57.

Similarly the operating piston of cylinder 54 is mounted upon the outer end of piston rod 42 of the front or discharge retort piston 36, and the retort piston is moved longitudinally of the retort by means of fluid under pressure admitted to supply pipe 57 controlled by four-way valve 58.

The partial rotation of piston rods 41 and 42 to produce oscillation of the agitator bar 49 is effected by chains 59 and 60 which pass over sprockets 61 and 62 operatively mounted on the respective piston rods and corresponding sprockets 63 and 64 which are fixed to a common counter-shaft 65. Counter-shaft 65 is driven by an electric motor 66 through a speed changing device 67, a speed reducer 68 and chain 69. The speed changer 67 may conveniently be of any type which provides a convenient means of quickly and positively changing the speed of movement of the agitator bar without varying the speed of the driving motor. The agitator bar is oscillated at a rate of about ½ to 2 complete oscillations per minute, while the motor 66 and speed changer 67 normally operate at comparatively high speed. Such a large speed reduction as this can readily be obtained by means of the speed reducer 68 containing a set of suitably arranged gears.

The mounting of the sprockets 61 and 62 upon the piston rods 41 and 42 is of particular construction in order to impart positive rotation to the piston rods and permit them to slide longitudinally through these mountings during the longitudinal movement of the pistons. This is shown in detail in Fig. 11 where it will be seen that sprocket 62 is carried upon a collar 70 which rotates on bearing 71 arranged near the end of the fluid cylinder 54. Piston rod 42 passes with a sliding fit through collar 70 so that the sprocket and collar can rotate freely with respect to rod 42. Situated at the outer end of collar 70 is a jaw clutch member 72, and a coacting jaw clutch member 73 is keyed to rod 42.

Hence when the retort piston 36 is in its normal position as shown in Figs. 1 and 4, the clutch members are engaged so that the rod 42 may be positively rotated by the sprocket under the action of chain 60. However when the piston rod moves to the right in order to carry the retort piston 36 forward during a discharge operation, the jaw clutch members separate, member 72 thereof being held in position adjacent the cylinder 54 by means of bearing 71 and the member 73 moving forward with the piston rod.

The mechanism for introducing gas into the retort and preheater preferably in impulses or under pulsations of pressure will now be described. When it is desired to inject gases such as air or steam by impulses into the retort and preheater, such gas is supplied through pipe 74 (Fig. 1) and the supply may be varied by means of valve 75. From this valve the supply pipe branches, one branch feeding the retort and the other the preheater. The gas for the retort flows to branch 76 through a preheating coil 77 which is disposed adjacent one side of the retort 15 as will be seen in Fig. 2. The gas in flowing through this coil is preheated to substantially the temperature within the retort, and then is carried by means of pipe 78 to a pulsation valve 79, the construction of which will be described below, and thence to a connection 80. Attached to connection 80 is a flexible steel hose 81 the other end of which is connected with a swivel joint 82 mounted on the outer end of an extension of piston rod 41 of the retort piston 37, which extends through the outer end wall of fluid cylinder 53.

Figure 6:
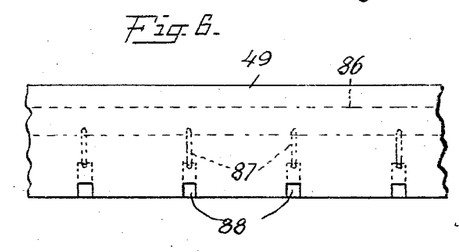
Fig. 6 is an enlarged elevation of a fragment of the agitator bar.
Figure 7:
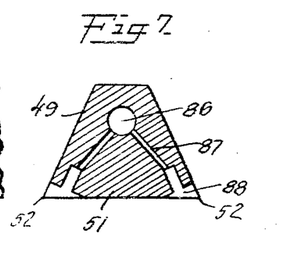
Fig. 7 is a transverse section of the agitator bar.

The rod 41 is bored longitudinally from end to end so that the gas may flow through it to a point adjacent retort piston 37. Here there is a lateral bore in the rod intersecting the longitudinal bore into which a connection 83 is received for a second length of flexible steel hose 84. A similar connection 85 on the opposite end of this hose leads the gas to a longitudinal bore 86 in the agitator bar 49 (see Figs. 4, 6 and 7). The gas in travelling along the bore 86 is ejected therefrom through a plurality of apertures 87 spaced uniformly throughout the length of the agitator bar. These apertures terminate at the sharp corners 52 of the bar. The apertures are enlarged at their outer ends as indicated in Fig. 7 for the purpose of preventing stoppage, and preferably terminate in lateral passageways 88 to still further reduce the tendency for the collection of solid material therein and to allow the gas emerging therefrom to have free access both below and at the sides of the bar.

Returning now to the injection of gas under impulses or pulsations into the preheater, gas may be led from valve 75 through branch 89 and heating coil 90 at the base of the preheater to a second pulsation valve 91 from whence it is admitted to the preheater.

Pulsation valves 79 and 91 are of similar construction and are illustrated in Figs. 9 and 10. They each comprise a perforated disc 92 journalled at 93 to rotate between the two halves of the casing 94. The two halves of the casing fit closely the smooth sides of the disc while permitting the disc to rotate freely between them. In the valve illustrated there are two apertures in the disc and there are two apertures in the casing disposed on opposite sides of the disc bearing 93. As the disc rotates, the apertures in the casing will be alternately blanked off or closed when blank portions of the disc are opposite the apertures in the casing. The disc is rotated rapidly by an electric motor 95, the shaft of which extends into the valve casing through a suitable packing gland 96 and has mounted at its inner end a pinion 97 which engages gear teeth on the periphery of the disc 92.

Under certain conditions, instead of injecting air or steam into the retort and preheater, it is desirable to inject a gas which will produce a reducing atmosphere instead of an oxidizing atmosphere in the retort. Thus products of combustion from an internal combustion engine may be introduced, and accordingly in Fig. 1 suitable piping connections are illustrated for employing the exhaust gases from the internal combustion engine 98.

The exhaust gases are led from the exhaust manifold to a two-way valve 99 by means of which they may be directed either outwardly to an exhaust muffler (not shown) or upwardly through line 100 to the distillation apparatus. Valve 101 admits the gases from line 100 to the connection 80 and thence through the hollow piston rod 41 to the agitator bar 49 and into the retort. When the internal combustion engine is used as the source of gas for pulsation injection, valve 102 which is placed in line 78 ahead of the pulsation valve 79 is closed so as to prevent the exhaust gases from entering the pulsation valve.

Valve 103 admits the exhaust gases from line 100 into line 104 by which they are carried directly to the preheater 16. When the source of gas for injection under impulses or pulsations is received from supply pipe 74 instead of from the internal combustion engine, valves 101 and 103 are of course closed and valve 102 is opened.

During the distillation of a batch of material in the retort 15, any moisture which is in the material is converted into steam, and a considerable portion of the material is volatilized. As previously mentioned, the volatile products escape from the retort 15 through the outlet 47 and any liquid formed which does not volatilize at the operating temperature passes out through drain 48. These meet in the vertical pipe 105, the lower end of which extends to a point just above the bottom of a closed condensate tank 106. A valve 107 is placed in the conduit 129 leading from the discharge port 40 of the retort so that no material can escape from the retort during a distillation operation through this port.

A body of liquid is maintained in the tank 106, the level thereof being determined by the height of the overflow pipe 108 which leads out of the bottom of the tank and extends upwardly at one side thereof. The level of the liquid can be varied by swinging the upper end of this pipe 108 so as to change its elevation.

The liquid discharged through outlet 48 of course flows down and collects in tank 106. The vapors and gases discharged through outlet 47 also flow down through pipe 105, and the higher boiling point material in them is condensed and collects in tank 106. The uncondensed gas bubbles up through the liquid in the tank and passes out through pipe 109 in which is placed valve 110.

The preheater 16 is also provided with a vapor outlet 113 at the top and a drain outlet 114 at the bottom for liquid. The entrances to these outlets are provided with perforated openings and with guards 115 to prevent the solid material from clogging them. A pipe 116 leads from vapor outlet 113, and a pipe 117 from drain outlet 114. These two pipes join at the base of the preheater, and deliver their vapor and liquid to pipe 118 which leads to a second condensate tank 119 (see Fig. 1), the lower end of pipe 118 being near the bottom of the tank as in the case of condensate tank 106.

The specific gravity of the condensate in tanks 106 and 119 depends upon the operating temperatures of these tanks. These temperatures can be controlled by lagging the tanks or by cooling them artificially.

The vapor and gas which passes condensate tank 106 without being condensed flows through pipe 109 to pipe 111 where it joins uncondensed vapor and gas from tank 119. Both then pass through pipe 112 to some common form of condenser such for example as a tubular condenser (not shown) wherein they are cooled approximately to atmospheric temperature. The greater portion of the condensing work is done in this condenser and causes further condensation, the lighter or lower boiling point materials in the vapors being condensed at the lower operating temperature of this condenser. The gas which remains is sent through suitable scrubbers, and other treatment apparatus if desired, and then to storage in a gas holder, none of this apparatus being illustrated.

There is a by-pass between pipe 118 directly to pipe 112 leading to the condenser and gasholder, and valves 120 and 121 in the by-pass and in pipe 118 respectively afford a means of discharging pipe 118 directly into pipe 112 and cutting out the distillate tank 119 when it is desired to carry on vacuum distillation, the vacuum-producing means being connected to pipe 112.

Under certain conditions which will be referred to below, it is sometimes desirable to pass the vapors from the retort 15 into the preheater 16 instead of to the condensate tank 106, and for this purpose pipe 122 joins the upper end of pipe 105 with the interior of the preheater 16. A valve 123 is placed in pipe 122 above the outlet 47.

Figure 5:
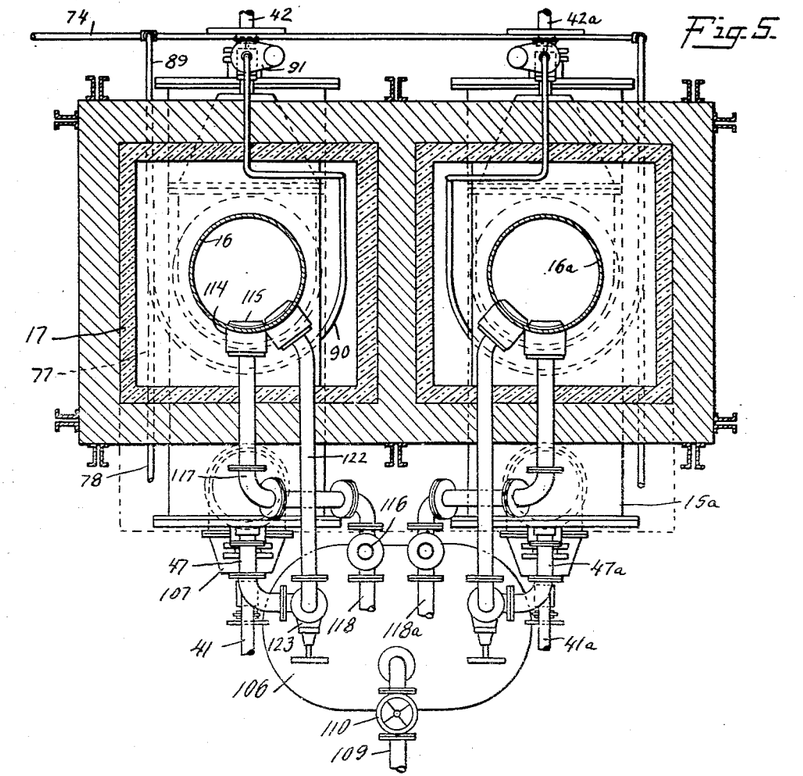
Fig. 5 is a horizontal section taken on line 5—5 of Fig. 4.

Referring to Fig. 5, it will be seen that a single condensate tank 106 has been used for the two-retort unit shown. Hence the gas conveyed by pipe 109 is the product of both retorts. It will be understood that the operating pressure in the retorts is determined by the height of the liquid in the condensate tank 106, which may be varied by swinging the overflow pipe 108. A similar overflow pipe 124 is provided for the condensate tank 119 and this pipe may also be swung about its connection at the base of the tank so as to vary the elevation of its upper end and thus vary the height of the liquid level within the tank. The height of this liquid determines the operating pressure within the preheater 16.

On account of a single condensate tank 106 being used for the two retort units, the operating pressure in both retorts must be equal. Similarly the pipes 118 and 118a from the two preheaters of the double unit are preferably joined together and carried to the distillate tank 119, so that the pressure in the two preheaters is also equal and under the control of the single distillate tank. It will be understood that if desired separate condensate tanks 106 and 119 can be used for each distilling unit. Safety valves 125 and 126 are provided to prevent the pressure within the retort and preheater respectively from rising above predetermined values.

Although not shown in the drawings, it will be understood that all of the pipes and connections are provided where necessary with suitable lagging in order to conserve heat.

The operation of the apparatus is as follows:

We will assume that the retort 15 has just been emptied of a charge and is ready to receive a fresh charge. The burners 18 are operating, and the apparatus is heated to normal operating temperature which in the retort is in the neighborhood of 1100 to 1200° F. and in the preheater in the neighborhood of 200° to 300° F. Valve 29 at the bottom of the preheater is opened permitting the partially treated material in the preheater 16 to descend into the retort between the pistons 36 and 37 thereof which are in their normal positions shown in Fig. 4, so that the entire distilling space between these pistons is heated to substantially the same temperature by means of the burners. After this transfer of the material, valve 29 is again closed.

In order to remove obnoxious gases from the preheater 16, and prevent them from escaping through the mouth 27, when it is open to receive a fresh charge, an exhauster 127 is set in operation which withdraws these gases from the preheater through pipe 128. The charging valve 28 and mouth 27 are now opened and a fresh charge of garbage or other material to be treated is passed into the preheater from the charging floor 26.

As soon as the fresh retort charge is received from the preheater, the motor 66 is started and the oscillation of the pistons 36 and 37 and the agitator bar 49 is commenced. The oscillation of the agitator bar between the dotted positions shown in Fig. 8 is accomplished by reversing the motor 66 when the agitator bar reaches each of the dotted positions.

Simultaneously with the starting of the agitator bar 49, the injection of gas through the agitator bar into the retort is commenced, as well as the injection of gas into the preheater. As previously explained, either a gas such as air or steam, or the exhaust gas from an internal combustion engine, may be used. In the case of air or steam, the gas is admitted by opening valve 75 in the gas supply line and starting the impulse or pulsation valves 79 and 91. The gas then flows through the preheating coil 77, the pulsation valve 79, the hollow piston rod 41, and into the hollow agitator bar 49 through the flexible steel hose 84 within the retort. The gas flows into the preheater from valve 75 through the preheater coil 90 and pulsation valve 91.

If it is desired to use gas from the internal combustion engine 98, valve 75 is left closed and valve 102 is closed, and valves 101 and 103 opened. Valve 99 is adjusted so that a desired proportion of the exhaust will be passed to the distillation apparatus, the remainder going to the muffler. When the exhaust gases from the engine are used, it is not necessary to preheat them and the heat of these gases aids in the distilling operations.

It will be understood that when gas from supply pipe 74 is used, the preheating coils 77 and 90 heat the incoming gas to substantially the temperature existing within the retort. When steam is used, these coils serve to superheat the steam to substantially this temperature.

The overflow pipes 108 and 124 in distillate tanks 106 and 119 respectively are adjusted so as to produce a level of liquid in these tanks corresponding to the pressure which it is desired to maintain in the retort 15 and preheater 16. This operating pressure will depend to some extent upon the materials being treated but in garbage treatment a pressure of from one-half to two lbs. per square inch is preferable.

The pressure of the gas injected into the retort and preheater may vary considerably in different arrangements of the apparatus, say from 25 to 75 lbs., but the intention is that the gas shall issue from the passageways 87—88 with sufficient force to dislodge any material which may have accumulated in these openings and particularly to materially enhance the agitating effect of the agitator bar 49. The injection of gas in impulses, puffs or pulsations has been found to be remarkably effective in mixing the various constituents of the material in the retort during the movement of the agitator bar.

For this reason it is desirable to cause the pulsations of the incoming gas to produce an ejection of the gas from the passageways 87—88 with as great a force as possible, and to this end the pulsation valves 79 and 91 are placed close to the retort and preheater respectively so that the interconnecting pipes therebetween are as short as practicable. Also the disc valve construction shown in Figs. 9 and 10 applies the gas pressure very quickly and cuts it off just as quickly.

The force with which the impulses of gas are ejected from the gas inlets into the retort and preheater depends also upon the frequency of the pulsations because the volume of gas in the pipes between the pulsation valves and engine and these inlets tends to smooth out the sudden changes in pressure occurring at the valve and in the engine manifold. Hence the most effective frequency is used so far as possible, by varying the speed of the valve motor 95 and by varying the number of cylinders from which exhaust is used.

The very effective agitation produced by the movement of the agitator bar 49, and the pulsating injection of the gas therethrough produces a remarkable stirring of the contents of the retort and maintains a remarkably uniform temperature throughout the retort. The sharp edges of the agitator bar effectively remove particles of carbonized material which tend to cake upon the interior surface of the retort. This keeps the walls of the retort clean so that heat is transferred rapidly through the walls to the material being treated and it also produces conditions which are highly favorable to catalytic action. Thus for example the particles of carbon which are scraped off from the interior surface of the retort are blown by the impulses of gas being ejected from the agitator bar into the mass of distilling material. The result is that, assuming these particles of carbon to be catalytically active, the catalytic agent and the reactive material are brought into intimate and repeated contact with one another.

Moreover the injection of gas into the retort in the dynamic pulsating flow described above unaccompanied by movement of the agitator bar produces a remarkable degree of stirring or agitation of the contents of the retort and maintains a remarkably uniform temperature throughout the retort. Indeed the agitation of the contents of the preheater is produced entirely in this way, since there is no agitator bar in the preheater.

The volatile materials, vapors and gases, pass out of the retort and preheater through the pipe connections previously described, and are passed through the condensate or distillate tanks 106 and 119 respectively, the uncondensed gas being delivered through pipe 112 to the tubular condenser (not shown) and gas holder. Two arrangements of pipe connections may be used.

If the gases coming from the retort 15 contain only a small proportion of vapor that is condensable at the temperature and pressure existing in the preheater 16, these gases are sent into the preheater. Accordingly valve 123 is opened and valve 110 is closed so as to permit the vapor and gases discharged from retort 15 to pass into preheater 16 instead of being delivered to the condensate tank 106. In this way only the liquid products draining through outlet 48 are recovered in tank 106, and the heat contained in the vapors and gases from the retort is used to aid in heating the material in the preheater instead of being wasted in tank 106.

Substantially the same result can be obtained by partially opening valve 29 instead of or in addition to opening valve 123, or by constructing the gate of valve 29 as a grid which will prevent the passage of solid material but will permit the passage of liquid and vaporous material. In this case, however, the liquid material from preheater 16 will descend into retort 15 and be recovered in tank 106 whereas if the retort and preheater are connected only by valve 123, the liquid evolved in the preheater is collected in tank 119. With either connection, however, some cracking of the heavier hydrocarbons will take place.

The second arrangement of the retort and preheater connections is preferably employed when the gases from retort 15 contain a large proportion of vapors which will condense at the operating temperature and pressure of preheater 16. Under these conditions little heat will be saved by sending the gases through the preheater because these vapors will condense and must be revaporized and will load up the system. Valve 29 is, therefore, tightly closed and valve 123 is closed and the retort 15 and preheater 16 are operated separately.

The lighter hydrocarbons and other liquids which vaporize at a lower temperature are expelled during the treatment in the preheater 16 and the liquefiable portion of these materials is collected mainly in the condensate tank 119 and to some extent in the condenser to which line 112 is connected. The more difficultly volatilizable materials are vaporized in retort 15 and pass to the condensate tank 106 where they are liquefied and drawn off through the outlet 108. Those which are not condensed here are condensed in the condenser to which line 112 is connected.

It will be understood that in the case of garbage distillation both operations may be used. Shortly after the retort is charged, the vapors contain a large amount of saturated steam which is not advantageous to send into the preheater. After the water is distilled off, the lighter oils will distill; even then it is not advisable to send the gases into the preheater, but when the heavier oils start to come over (at a temperature of say 400° F.) a saving of heat can be obtained by passing the gases to the preheater. This procedure carries some heavy oil vapor into the preheater and hence means recycling of the heavy oils as they will condense in the preheater. The heavy oils will accumulate from charge to charge and it will be necessary at intervals to distill a charge without sending the gases through the preheater in order to remove the heavy oils. The continuous redistilling of heavy oils will result however in a certain amount of cracking of these oils.

After the material in retort 15 has substantially all been carbonized, motor 66 is stopped, the source of gas injection is cut off and valve 56 is operated to cause fluid pressure cylinder 53 to move rear piston 37 to the right uncovering discharge port 40. The valve 107 below this port is then opened. Then valve 58 is actuated to cause fluid pressure cylinder 54 to move discharge piston 36 to the right and push the carbonized residue in the retort into the discharge port through which it falls and is collected in a suitable receptacle placed below the discharge conduit 129.

By a reverse manipulation of valves 58 and 53, discharge pistons 36 and 37 are returned to their normal positions, and the cycle of operations is then repeated.

The foregoing is intended to serve as an exemplifying disclosure of the principles of my invention, and the invention is to be considered as including such constructions as come within the scope of the appended claims.

I claim:—

1. In an apparatus of the character described, a horizontal retort, means for heating the same, a discharge port in the wall of the retort near one end thereof, a piston slidable in the retort at the said end thereof and disposed inwardly therefrom to close said port, a discharge piston positioned near the opposite end of the retort, means for charging the retort between said pistons, actuating means for moving the first piston to uncover the discharge port, and actuating means for moving the second piston to force the charge into said port.

2. In an apparatus of the character described, a cylindrical retort, means for heating the same, a pair of pistons spaced from one another and slidable in the retort for controlling the position of a charge therein, an agitator bar carried eccentrically by said pistons, and means for rotating the pistons to cause the agitator bar to move within the retorts and stir the contents thereof.

3. In an apparatus of the character described, a cylindrical retort, means for heating the retort, a pair of pistons disposed in spaced relation within the retort for controlling the position of a charge therein, the retort having a discharge port near one end thereof, means for moving the pistons longitudinally of the retort to effect the discharge of material through said port, said pistons each having an eccentrically disposed aperture, a bar loosely mounted in said apertures, and means for rotating said pistons so as to cause a stirring of the contents of the retort by the movement of said bar.

4. In an apparatus of the character described, a cylindrical retort, means for heating the retort, a pair of pistons spaced from one another and slidable in the retort for controlling the position of a charge therein, each of said pistons having a peripheral opening therein, means for rotating the pistons and maintaining said peripheral openings substantially in alignment with one another, and an agitator bar extending loosely through said peripheral openings in contact with the walls of the retort.

5. In an apparatus of the character described, a cylindrical retort, means for heating the retort, a pair of spaced pistons longitudinally movable within the retort for controlling the position of a charge therein, said pistons each having a peripheral opening therein having outwardly diverging side walls, an agitator bar extending longitudinally of the retort and carried loosely in said peripheral openings whereby during rotation of said pistons the agitator bar is forced into intimate scraping engagement with the interior wall of the retort.

6. In an apparatus of the character described, a retort, an agitator bar therein of trapezoidal cross-section, the sharp corners thereof serving as scraping edges, said edges being transversely kerfed at spaced intervals throughout the length thereof, and the bar having a longitudinal gas passageway therein and spaced transverse passageways leading to said respective kerfs, whereby gas ejected through said kerfs would assist a motion of the bar in mixing scraped-off material with other contents of the retort.

7. In an apparatus of the character described, a cylindrical retort, means for heating the retort, a pair of spaced pistons mounted within the retort for controlling the position of a charge therein, a hollow piston rod for moving one of said pistons longitudinally with respect to the retort, a pair of aligned apertures extending through the walls of said pistons, an agitator bar carried loosely in said apertures, means for rotating said pistons to cause said agitator bar to stir the contents of the retort, said bar having a longitudinal channel and transverse gas ejection openings connected with said channel, means for supplying gas under pressure to said hollow piston rod, and flexible means within said retort for connecting the interior of said hollow piston rod with the longitudinal channel in the agitator bar so as to permit longitudinal movement of the piston with respect to the agitator bar.

8. In an apparatus of the character described, a cylindrical retort, means for heating the retort, a pair of pistons within the retort for controlling the position of a charge therein, an agitator bar carried eccentrically by said pistons, piston rods for said pistons extending through the respective heads of the retort, means for independently moving said piston rods longitudinally, and means for rotating said piston rods synchronously with each other.

9. In an apparatus of the character described, a cylindrical retort, means for heating the retort, a pair of pistons within the retort for controlling the position of a charge therein, piston rods for said pistons extending through the respective heads of the retort, means for independently moving said piston rods to control the longitudinal positions of said pistons, and means for rotating said piston rods comprising a common driving means and clutching means for drivingly connecting each of said piston rods with said common driving means.

10. In an apparatus of the character described, a cylindrical retort, a pair of pistons within the retort each having piston rods extending through the respective ends of the retort, fluid pressure cylinders for actuating said pistons, an agitator bar carried eccentrically by said pistons, a driving member mounted for rotation upon each of said piston rods, and clutch devices engageable and disengageable by longitudinal motion each having one member thereof associated with said driving member and the other member thereof fixed to one of said piston rods so that when the retort pistons are in one position said driving members are clutched to the piston rods to rotate the same and thereby impart motion to the agitator bar, and when said retort pistons are displaced from said position said clutches are disengaged.

11. In an apparatus of the character described, a retort, an agitator bar therein having a scraping edge which is kerfed at spaced intervals throughout its length, said bar having a passageway extending longitudinally thereof and transverse passageways leading therefrom to said kerfs, whereby gas ejected through said kerfs would assist a motion of the bar in mixing scraped-off material with other contents of the retort.

12. In an apparatus of the character described, a retort, means for heating the retort, a hollow agitator bar having a scraping edge extending longitudinally thereof mounted for movement transversely of the bar along the inner surface of the retort with said edge in scraping contact with the inner surface of said retort, and means for ejecting gas from the agitator bar into said retort to enhance the stirring action of the bar on the contents of the retort.

13. In an apparatus of the character described, a horizontal retort, means for heating the same, a discharge port in the wall of the retort near one end, a piston slidable in the retort at the said end thereof and disposed inwardly therefrom to close said port leaving a discharge space between said piston and the end of said cylinder, a discharge piston positioned near the opposite end of the retort, means for charging the retort between said pistons, said first piston having perforations therein to permit the passage of vapors and liquids into said discharge space, actuating means for moving the first piston to uncover the discharge port, and actuating means for moving the second piston to force the charge into said port.

14. In an apparatus of the character described, a cylindrical retort, means for heating the retort, a pair of spaced pistons mounted within the retort controlling the position of a charge therein, a hollow piston rod for moving one of said pistons longitudinally with respect to the retort, and an agitator bar carried eccentrically by said pistons, means for rotating said pistons to cause said agitator bar to stir the contents of the retort, said bar having a longitudinal channel and transverse gas ejection openings connected with said channel, means for supplying gas under pressure to said hollow piston rod, and flexible means within said retort for connecting the interior of said hollow piston rod with the longitudinal channel in the agitator bar so as to permit longitudinal movement of the piston with respect to the agitator bar.

15. In an apparatus of the character described, a horizontal retort, means for heating the same, a discharge port in the wall of the retort near one end, a piston slidable in the retort at the said end thereof and disposed inwardly therefrom to close said port leaving a discharge space between said piston and the end of said cylinder, a discharge piston positioned near the opposite end of the retort, means for charging the retort between said pistons, said first piston coacting with the walls of the retort to hold the solid material of the charge in position but permitting passage of liquid and vaporous material into said discharge space, actuating means for moving the first piston to uncover the discharge port, and actuating means for moving the second piston to force the charge into said port.

16. In an apparatus of the character described, a retort, means for heating the same, means for charging the same, a discharge port in the wall of the retort near one end thereof, a piston slidable in the retort at the said end thereof and disposed inwardly therefrom to close said port, actuating means for moving said piston to uncover the discharge port, and means for causing the material within the retort to discharge through said discharge port.

AXEL C. GRONBECK.